United States Patent [19]

Iacobucci et al.

[11] 4,285,985

[45] Aug. 25, 1981

[54] PROCESS FOR ENHANCING THE SUNLIGHT STABILITY OF RUBROLONE

[75] Inventors: Guillermo A. Iacobucci; James G. Sweeny, both of Atlanta, Ga.

[73] Assignee: The Coca-Cola Company, Atlanta, Ga.

[21] Appl. No.: 133,676

[22] Filed: Mar. 25, 1980

[51] Int. Cl.$^3$ .............................................. A23L 1/272
[52] U.S. Cl. .................................... 426/540; 426/250; 426/262; 426/268; 426/590
[58] Field of Search ............... 426/250, 540, 590, 262, 426/268

[56] References Cited

U.S. PATENT DOCUMENTS 3,940,504  2/1976  Jackel ................................. 426/540

FOREIGN PATENT DOCUMENTS 51-112561 10/1976 Japan .
51-144767 12/1976 Japan .

Primary Examiner—Jeanette M. Hunter
Attorney, Agent, or Firm—John R. Martin

[57] ABSTRACT

Disclosed herein is a process for reducing the tendency of the pigment rubrolone to fade upon exposure to direct sunlight wherein the pigment is combined with quercetin-5'-sulfonate. Pigment compositions comprised of rubrolone and quercetin-5'-sulfonate as well as food compositions containing these components are also disclosed.

13 Claims, No Drawings

PROCESS FOR ENHANCING THE SUNLIGHT STABILITY OF RUBROLONE

BACKGROUND OF THE INVENTION

The present invention relates generally to the stabilization of pigments against sunlight-induced bleaching and, in particular, relates to such stabilization of the pigment rubrolone.

Rubrolone is a water-soluble amorphous red solid of microbial origin having the emirical formula $C_{23}H_{23}NO_8$ and the following structural formula:

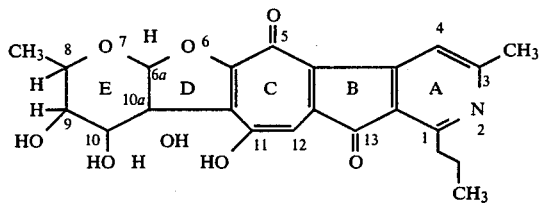

8(R), 9(R), 10(S), 10a(R)-tetrahydro-9,10,10a,11-tetrahydroxy-3,8-dimethyl-1-propyl-6aH(S)-pyrano[2",3":5',4]furo[2',3':5,6]azuleno[2,3-c]pyridine-5,13-dione.

The preparation and structural analysis of rubrolone is described in Palleroni, et al., *The Journal of Antibiotics*, vol. 31, no. 12, p. 1218 (1978); Schuep, et al., *The Journal of Antibiotics*, vol. 31, no. 12, p. 1226 (1978); and U.S. Pat. No. 4,057,533.

Although the significant water solubility of rubrolone makes it attractive as a colorant for foods, and particularly for water-based products such as beverages, we have found that rubrolone undergoes degradation upon direct exposure to sunlight with a resultant color loss in products colored therewith.

SUMMARY OF THE INVENTION

It is an object of the present invention to provide a process for stabilizing the pigment rubrolone against photodegradation, that is, to reduce the tendency of rubrolone, and products containing rubrolone, to fade or lose color when exposed to sunlight.

Another object of the present invention is to provide a photostable colorant composition comprised of rubrolone.

Yet another object of the present invention is to provide photostable food compositions containing rubrolone.

These and other objects are achieved through our discovery that the tendency of rubrolone, and compositions or foodstuffs containing rubrolone, to lose color when exposed to sunlight can be substantially reduced by combining with rubrolone, or including in compositions containing rubrolone, quercetin-5'-sulfonate as a photoprotective agent.

Quercetin-5'-sulfonate, a water-soluble derivative of the flavonol quercetin, has been described many times previously primarily as a reagent for spectrophotometric analysis of zirconium, hafnium, uranium and other elements. It has also been suggested as an ingredient in suntan lotion. For many years it was thought to be the 8-isomer, however, the correct 5' sulfonate structure was finally determined by NMR [Terpilowski, et al., *Diss. Pharm. Pharmacol.*, 1970 (22), 389–93].

Preparation of quercetin-5'-sulfonate is described in Terpilowski, et al., supra, and consists generally of dissolving quercetin (1 g) in cencentrated sulfuric acid (4 g) and allowing the mixture to stand for 2 hrs. at 80° C. The solution is poured into excess ice water and the solution neutralized with solid $CaCO_3$. The resulting $CaSO_4$ is removed by filtration and the filtrate passed through a strong cation exchange resin in the Na+ form to remove excess Ca++ ions. The eluent is then freeze-dried to yield the 40–60% pure sulfonate. The pure 5'-sulfonate can then be separated from disulfonate by-products by preparative high pressure liquid chromatography (HPLC).

Alternatively, the quercetin-5'-sulfonate can be recovered in a curder form (purity: 86%) by pouring the sulfonation reaction mixture into galcial acetic acid, and removing the precipitated product by filtration.

According to one aspect of the present invention, rubrolone pigment compositions are prepared by combining rubrolone with quercetin-5'-sulfonate. Although it does not appear as if either an upper or lower limit exists on the ratio of the photoprotective agent quercetin-5'-sulfonate to the rubrolone pigment which will result in a reduced tendency of the rubrolone to fade upon exposure to sunlight, practical considerations indicate that a range of molar ratios of photoprotective agent: pigment of from about 1:1 to about 10:1 are preferred, with optimum molar ratios in the range of from about 2:1 to 5:1.

The so-prepared pigment composition may be utilized in any products where coloring with rubrolone, either alone or in admixture with other colorants, is desired. The pigment composition of the present invention may be prepared as a dry admixture which is suitable for mixing with additional dry components to form a product, e.g., a beverage powder, adapted for dissolution in water. The pigment composition may also be utilized either as a component in preparing water-based concentrates or syrups adapted to be diluted with water to form a single-strength beverage or as a component in single-strength beverages per se.

The present invention additionally provides food compositions comprising a suitable food base, rubrolone and an amount of quercetin-5'-sulfonate effective to reduce the fading tendency of rubrolone upon exposure to direct sunlight. The food compositions may, as earlier described, be in the form of a dry mixture of ingredients, a water-based concentrate or a water-based ready-to-consume, single strength product. In the preferred embodiment of this invention, the food composition, be it a dry mix, concentrate or single-strength beverage, will contain acidulants such as citric and phosphoric acid. As described earlier with respect to pigment compositions formed from admixture of rubrolone and quercetin-5'-sulfonate, the effective amount of the photoprotective quercetin-5'-sulfonate to be added to food compositions containing rubrolone is not per se critical, but is typically in an amount so as to result in a molar ratio of photoprotective agent: pigment of from about 1:1 to about 10:1, with optimum ratios in the range of from about 2:1 to about 5:1.

The pigment composition of the present invention, food compositions formulated with the pigment composition and food compositions containing rubrolone and quercetin-5'-sulfonate provide products having reduced tendencies to discolor or fade upon exposure to direct sunlight. As will be apparent to those skilled in the art, however, the desired photostability can be negated, despite the effect of the photoprotective quercetin-5'- sulfonate, by inclusion in the compositions of ingredients which themselves might tend to destroy either the pigment or the photoprotective agent, or contribute to such destruction, or by exposure of the composition to conditions, such as elevated temperature, which might bring about the same or similar results. Although the effect of any one or a number of these factors on the photostability of rubrolone/quercetin-5'-sulfonate containing compositions is not entirely predictable, formulation of products containing suitably compatible ingredients and usage at non-destructive conditions is considered well within the skill of those practiced in this art.

DETAILED DESCRIPTION OF THE INVENTION

The invention will be further described with the aid of the following illustrative examples.

EXAMPLE I

Rubrolone was dissolved at a level of 20 ppm in a 0.01 M citric acid solution containing 200 ppm sodium benzoate as a preservative. A second sample, identically prepared, had added thereto 100 ppm of quercetin-5'-sulfonate. The samples, in 100 ml. Pyrex glass flasks, were exposed to direct sunlight and aliquots removed periodically to determine the absorbance at $\lambda_{max}$(525 nm). Sunlight incident energy was measured with an Epley meter. The results in the following Table I are expressed as precent color remaining, defined as [absorbance$\lambda_{Max}$]$_{time=n}$/[absorbance$\lambda_{max}$]$_{time=0}$×100.

TABLE I

| SUNLIGHT EXPOSURE (LANGLEYS (cal./cm$^2$)) | RUBROLONE (% COLOR REMAINING | RUBROLONE + QUERCETIN-5'-SULFONATE |
|---|---|---|
| 0 | 100% | 100% |
| 200 | 72.3% | 93.7 |
| 300 | 55.9 | 84.5 |
| 400 | 47.9 | 85.2 |
| 600 | 33.5 | 78.7 |
| 1000 | 9.5 | 59.2 |
| 1200 | — | 48.0 |
| 1350 | — | 41.2 |

EXAMPLE II

A similar experiment was conducted using 30 ppm rubrolone and 100 ppm quercetin-5'-sulfonate in a 0.01 M citric acid solution containing 200 ppm sodium benzoate preservative. The results are shown in Table II.

TABLE II

| SUNLIGHT EXPOSURE (LANGLEYS) | RUBROLONE | RUBROLONE QUERCETIN-5'-SULFONATE |
|---|---|---|
| 0 | 100% | 100 |
| 205 | 81 | 97 |
| 515 | 53 | 90 |
| 814 | 32 | 79 |
| 1060 | 20 | 74 |
| 1317 | 13 | 70 |

What is claimed:

1. A pigment composition comprising rubrolone and quercetin-5'-sulfonate.
2. The pigment composition of claim 1 wherein the molar ratio of quercetin-5'-sulfonate to rubrolone is in the range of from about 1:1 to about 10:1.
3. The pigment composition of claim 1 wherein the molar ratio of quercetin-5'-sulfonate to rubrolone is in the range of from about 2:1 to about 5:1.
4. A pigment composition consisting essentially of quercetin-5'-sulfonate and rubrolone in a molar ratio of about 1:1 to about 10:1.
5. A food composition containing the pigment composition of claim 4.
6. A food composition comprising a food base, rubrolone and an amount of quercetin-5'-sulfonate effective to reduce the tendency of the color imparted by said rubrolone to fade upon exposure to direct sunlight.
7. The food composition according to claim 6 wherein said food composition is a dry beverage mix adapted to be reconstituted in water to beverage strength.
8. The food composition according to claim 6 wherein said food composition is a water-based beverage concentrate adapted to be reconstituted to beverage strength.
9. The food composition according to claim 6 wherein said food composition is a single-strength beverage.
10. The food composition according to claim 6 wherein the molar ratio of quercetin-5'-sulfonate to rubrolone is in the range of from about 1:1 to about 10:1.
11. The food composition according to claim 6 wherein the molar ratio of quercetin-5'-sulfonate to rubrolone is in the range of from about 2:1 to about 5:1.
12. A process for producing a photostable colorant composition comprising combining rubrolone with an effective amount of quercetin-5'-sulfonate.
13. In a process for preparing food compositions containing the pigment rubrolone, the improvement comprising adding to said food composition an amount of quercetin-5'-sulfonate effective to reduce the tendency of the color imparted to the food composition by said rubrolone to fade upon exposure to direct sunlight.

* * * * *